United States Patent Office 3,367,872
Patented Feb. 6, 1968

3,367,872
ELECTROVISCOUS FLUID COMPOSITION
Thomas W. Martinek, Danville, and Donald L. Klass, Barrington, Ill., and Hillis O. Folkins, Claremont, Calif., assignors to Union Oil Company of California, Los Angeles, Calif., a corporation of California
No Drawing. Continuation-in-part of application Ser. No. 248,249, Dec. 31, 1962. This application Feb. 15, 1967, Ser. No. 616,155
20 Claims. (Cl. 252—74)

ABSTRACT OF THE DISCLOSURE

An electroviscous fluid comprising a non-polar oleaginous vehicle, such as a mineral oil, and a particulate solid from the group consisting of alumina, silica-alumina and mixtures thereof. The fluid may also contain other ingredients such as a surface active agent, an amine, a fatty acid and water.

---

This application is a continuation-in-part of application Serial No. 248,249, filed Dec. 31, 1962 and now abandoned.

This invention is directed to alumina-base or silica-alumina-base electric field-responsive compositions that evidence great change in bulk viscosity under the influence of an applied electric field.

It is known that certain fluids respond to the influence of an electric potential by evidencing an apparent and pronounced increase in bulk viscosity. This phenomenon is reversible and the compositions revert to their initial viscosity when the electric field is removed. Such fluids have been termed electroviscous fluids and are described in U.S. Patents 2,661,596, 2,661,825 and 3,047,507. These fluids are commonly used in clutches, wherein the fluid is disposed between the surfaces of two electrically conductive members and electric potential is imposed across the two members. The electroviscous fluid responds to the application of an electric potential by instantaneously, but reversibly, changing in apparent bulk viscosity. In strong fields, the fluid thickens into a solid or semisolid condition, whereby torque can be transmitted between the surfaces of the clutch members.

It is further known that certain electroviscous fluids, when exposed to an alternating electric field, exhibit a similar change in bulk viscosity, even though the fluid is not in contact with the potential-carrying electrodes. This phenomenon is used in chucking devices, by means of which conductive objects can be secured with an electroviscous fluid film. It is further known that by incorporating a suitable quantity of a finely divided, particulate, conductive material in the fluid used with an alternating-field chucking device, non-metallic, non-conductive objects can be secured with about the same efficiency with which non-conductive electroviscous fluids can be used to secure conductive objects.

Electroviscous fluids have found only limited commercial application, largely because of their relatively low holding power and the instability of the fluids known to the prior art. Such fluids suffered from serious disadvantages in that the change in apparent viscosity on exposure to an electric field, while dramatic, was yet insufficient to securely couple the driving and driven elements of clutches so that the torque transmitted could satisfy practical requirements. Moreover, the fluids of the prior art tended to deteriorate so that the forces that could be transmitted through the fluids gradually decreased to very low values. Also, phase separation of the fluids frequently occurred upon storage, rendering them useless. The rate of deterioration of prior art fluids is accelerated by storage or operation at temperatures above ambient temperatures. For example, fluids of the prior art were known to deteriorate, upon storage for as short a period as a week at temperatures of 150° F., to such an extent as to render the fluids useless.

It is, therefore, a primary object in this invention to provide electroviscous fluid compositions capable of displaying great change in apparent bulk viscosity upon exposure to an electric field, thereby greatly enhancing the force-transmitting characteristics of couplings or clutches with which the fluids may be employed. Another object of this invention is to provide electroviscous fluid compositions of outstanding initial electro-activity which can be stored for long periods of time without deterioration, phase separation, or reduction in electro-activity.

Electroviscous fluid compositions of the prior art comprise mixtures of fine particulate material, such as silica, an electrically stable oleaginous vehicle of high resistivity, a surface active agent, water, and minor amounts of sundry other ingredients. In accordance with the present invention, excellent electroviscous fluid compositions are formulated using alumina or silica-alumina as the particulate solid.

Electroviscous fluids compounded in accordance with this invention include, in addition to the alumina or silica-alumina, a high-resistivity oleaginous vehicle having a dielectric constant not greater than about ten, preferably in the range of about two to five, and preferably contain an amount of a surface active agent sufficient to render the composition fluid or thixotropic. Where the electroviscous fluid is to display greater electro-activity in the presence of both transient and constant potentials, the fluid may also contain an amine. The amount of amine required will be dependent upon the surface area and pore volume of the alumina or silica-alumina and the molecular weight and density of the amine. The presence of such a compound frequently enhances the electro-activity in the presence of a field of constant potential. It will be evident to those skilled in the art that the amine and the surface active agent may, in fact, be a single additive which provides both functions, but it is preferred that at least about 20 percent of the total surface active agent be a substantially neutral (neither acidic nor basic) surface active agent.

Aluminas and silica-aluminas employed in the electroviscous fluids of this invention are conventional materials and are readily available commercially. They may have low or high surface area-to-weight ratios. The alumina or silica-alumina particles should be of an average size in the range of about 0.04 to 10 microns diameter. They will preferably have a surface area well in excess of 10 square meters per gram and an average particle size of about 0.06 to 2.0 microns diameter. Commercial aluminas and silica-aluminas are available having average aggregate particle sizes below 2.0 microns. Additional grinding in micronizer equipment can reduce the particle size of the aluminas to within the preferred range. The alumina or silica-alumina will contain from about 4 to about 17 weight percent, preferably about 6 to 12 weight percent, of water based on dry alumina or silica-alumina.

Particulate aluminas suitable for use in the present invention are well known, particularly for use as catalysts or catalyst supports. They occur in a variety of forms, i.e., alpha monohydrate, beta, gamma, eta, chi, etc., any of which may be used in the present invention, although the different forms are not necessarily equivalent in behavior. The optimum form will depend on a variety of factors such as type of oleaginous vehicle, type and strength of electric field, viscosity of fluid, amount of alumina, type and amount of surfactant and nitrogen compound, etc., and is readily determined experimentally.

Particulate silica-alumina is also conventional for similar uses. Its preparation is well known and is described in numerous patents and other publications, for example, in U.S. Patent 2,854,401. Amounts of silica may vary from about 5 to 95 percent by weight. Again, the optimum form, including the percent of silica, of the silica-alumina will depend on the above factors and may be determined experimentally.

Mixtures of alumina and silica-alumina may also be employed in the fluids of the invention, the ratio of alumina to silica-alumina generally being in the range of about 1 to 20 to about 20 to 1. In addition, the compositions of the invention may include silica or other particulate solids, as disclosed in U.S. Patents 3,047,507 and 3,250,726, in admixture with the alumina or silica-alumina. Eta alumina and chi alumina have been found to be particularly effective in the compositions of the invention. The superiority of eta alumina, in particular, for use in compounding compositions of the invention was established by tests performed on experimental formulations which are reported in Table I. In each case the liquid vehicle was a high-grade mineral seal oil, and the surface active agent, where used, was glycerol mono-oleate. Static AC forces were measured using a steel plate movably supported 0.001 inch above the barium titanate surface of a standard, three-electrode chuck. Standard conditions of 2000 volts RMS per phase, three-phase, applied to adjacent electrodes 120 degrees out of phase, were maintained from test to test. The layer of electroviscous fluid was disposed between the steel plate and the barium titanate surface.

below about 20 percent provide fluids showing low force characteristics but these may be suitable for low force applications. It has been found that highest forces are obtained when the amount of alumina or silica-alumina used is the greatest amount which can be added without destroying the fluidity of the composition.

The oleaginous vehicle in which the alumina or silica-alumina is dispersed is preferably a refined mineral oil fraction having a viscosity within the range of about 30 to 300 SUS at 100° F., and an initial boiling point greater than about 400° F. A wide variety of non-polar oleaginous materials having a dielectric constant not greater than about 10, and which are, preferably, only weakly adsorbed by alumina, can be employed. Examples of suitable materials include white oils, lubricating oil stocks such as 85 vis neutral oil, and various synthetic oils. Examples of synthetic oils which may be employed are those such as are commonly used as transformer oils, polyester lubricants and synthetic oils resulting from polymerization of unsaturated hydrocarbons, polyfluoro derivatives, or organic compounds, especially fluorinated hydrocarbons in the lubricating oil viscosity range. The vehicle is preferably a material which is only weakly adsorbed by alumina, such as paraffins, olefins, and aromatic hydrocarbons, all of which are weakly adsorbed, the degree of adsorption increasing in the order stated. The vehicle can be considered to be only weakly adsorbed when it is less strongly adsorbed by the alumina employed in the electroviscous fluid than are the other constituents of the fluid,

TABLE I

| | Alumina | | | | | |
|---|---|---|---|---|---|---|
| | Alpha Alumina | Gamma Alumina | | | Silica Alumina | Eta Alumina | |
| | Wt. Percent Water on Alumina | | | | | | |
| | 0.05 | 0.44 | 5.94 | | 9.22 | 7.41 | 16.7 |
| | Formula No. | | | | | | |
| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Alumina, wt. percent | 67.1 | 82.0 | 41.6 | 48.6 | 52.0 | 42.4 | 46.3 | 46.0 | 49.3 | 54.9 | 58.0 | 63.0 | 51.6 | 50.6 | 49.4 | 57.2 | 56.2 | 53.0 | 57.2 |
| Mineral Seal Oil, wt. percent | 32.9 | 17.0 | 39.0 | 34.2 | 32.0 | 52.2 | 48.6 | 48.4 | 45.6 | 40.6 | 42.0 | 32.0 | 48.4 | 47.4 | 46.3 | 39.2 | 38.5 | 47.0 | 39.5 |
| Glycerol Mono-oleate, wt. percent | 0 | 1.0 | 19.4 | 17.2 | 16.0 | 5.4 | 5.1 | 5.6 | 5.1 | 4.5 | 0 | 5.0 | 0 | 2.0 | 4.3 | 3.6 | 5.3 | 0 | 3.3 |
| AC Force, oz | 0 | 16 | 0 | 14 | 14 | 14 | 9 | 8 | 9 | (¹) | (¹) | 25 | 34 | 34 | 23 | 50 | 57 | 18 | 32 |

¹ Set slightly.

The mineral seal oil employed in the formulations of Table I had the following composition:

Viscosity, SUS at $\begin{cases} 100° \text{ F.} \\ 210° \text{ F.} \end{cases}$ 41.1
31.3
Color, Saybolt _____ −5
Sulfur, wt. pct. _____ 0.20
Olefin, wt. pct. _____ 1.35
PONA analysis, vol. pct.:
　Naphthenes _____ 50
　Paraffins _____ 25
　Olefins _____ 1
　Aromatics _____ 24
IBP, °F. _____ 521
EBP, °F. _____ 622
Density, grams/cubic centimeter _____ .8443
Dielectric constant, 27° C. _____ 2.18

Formulation 17 (Table I) was stored for 30 days and again tested. There was no detectable phase separation or change in AC force characteristics. The DC force increased during storage from an initial value of 25 ounces per square inch to about 28 ounces per square inch.

Electroviscous fluids compounded in accordance with this invention will preferably contain in excess of about 20 percent by weight of alumina or silica-alumina (actual weight, including water), and usually about 35 to 60 percent by weight of alumina or silica-alumina. Amounts i.e., the surfactant and the nitrogen compound, if employed.

When alumina or silica-alumina is incorporated in a suitable oleaginous vehicle to compound an electroviscous fluid the vehicle is thickened to a certain extent. At high concentrations of particulate material the mixture takes on the characteristics of a heavy grease. Where amounts of alumina or silica-alumina in the preferred range are incorporated in the fluid it is usually necessary to add a material to fluidize the mixture and keep the viscosity of the product at a reasonable level. For this purpose, varying amounts of a surface active agent, preferably a neutral one, can be incorporated to maintain the mixture of alumina and vehicle fluid. Suitable surface active agents include anionic, cationic and nonionic agents. Anionic agents include alkyl aryl sulfonates such as dodecylbenzenesulfonate, sulfated alcohols and salts thereof such as oleyl and lauryl alcohol sulfates, sodium tetradecyl, heptadecyl and 2-ethylhexyl sulfates, esters of sodium sulfosuccinic acid such as sodium dialkylsulfosuccinate, sodium salts of sulfated monoglycerides such as the sodium salt of the sulfated glyceride of coconut oil fatty acids, etc.

Cationic agents include quaternary ammonium salts and salts of higher alkyl amines such as octadecylidmethylbenzyl ammonium chloride and lauryl pyridinium chloride.

Nonionic agents include ethers and esters formed by reaction of ethylene oxide with a variety of compounds such as fatty alcohols, alkyl phenols, glycol ethers, fatty acids, rosin acids, tall oil, fatty acid esters of sorbitol, fatty amides and fatty amines, e.g., the reaction product of nonyl phenol and from about 4 to 12 moles of ethylene oxide. Other nonionic agents are the fatty acid esters of polyhydroxy alcohols such as glycerol and sorbitol. Examples are glycerol monooleate, sorbitol mono, sesqui or trioleate, mono or tristearate and monolaurate or monopalmitate.

Other suitable surface active agents include fatty alcohols, such as octyl and dodecyl alcohols, and amine compounds such as 1-hydroxyethyl 2-heptadecenyl imidazoline.

Although any of the above-described surface active agents may be used in the compositions of the invention, they are not necessarily equivalent. The most effective surface active agent for a particular electroviscous fluid composition is best determined experimentally. Glycerol monooleate has, however, been found to be particularly effective in a variety of fluid compositions and is illustrated in the examples below. The surface active agent should be added in quantities sufficient to fluidize the mixture of vehicle and alumina or silica-alumina, but not greatly in excess of this amount. Excessive amounts of surface active agent may decrease the electro-activity of the product. However, suitable amounts of surface active agent may, in addition to fluidizing the mixture (probably by acting as a dispersing agent for the particulate material) also enhance the response of the fluid to an electric field, either AC or DC. Proportions of surface active agent will generally range from about 5 percent to about 25 percent by weight of the total composition. The optimum amount of surface active agent depends upon the type and amount of alumina or silica-alumina, particle surface area, particle size, water content, and the fluid consistency desired.

As stated above, where the electroviscous fluid is intended for activation by a constant potential, it may be advantageous to incorporate in the fluid about 0.1 to 25 percent, preferably not more than about 10 percent, by weight, of an amine. The amine may be a substituted or non-substituted aliphatic, aromatic or heterocyclic amine. It may be high or low in molecular weight, may or may not have fluidizing properties, and can contain other functional groups. Suitable compounds include primary, secondary, and tertiary amines, amnio-alcohols, aminoethers, and diamines having about 1 to 16 carbon atoms. Examples are methyl amine, butyl amine, octyl amine, dodecyl amine, hexadecyl amine, diethyl amine, diisopropyl amine, dibutyl amine, ethanol amine, propanol amine, ethoxyethyl amine dioctyl amine, trimethyl amine, triethyl amine, tributyl amine, ethylene diamine and propylene diamine. Suitable heterocyclic amines include substituted and unsubstituted pyridine, morpholine and imidazolene. Again, the above-disclosed compounds (amines) will not necessarily all be equivalent in a given electroviscous fluid composition and the most effective compound is best determined experimentally. 1-hydroxyethyl 2-heptadecyl imidazolene has, however, been found particularly effective in certain fluid compositions and its use is illustrated in Example II, below. The more basic amines have generally been found to be more effective.

It has also been found that the compositions of the invention may be enhanced, both as to response to an electric field and as to phase stability, by the addition of a carboxylic acid having a molecular weight not in excess of about 200. Fatty acids, i.e., acids having the formula $C_nH_{2n+1}COOH$, having from about 1 to 6 carbon atoms have been found most effective, with acetic acid being especially preferred. Amounts of the acid will vary from about 0.5 to 10 percent by weight, with 1 to 3 percent being the preferred range.

Although compositions containing substantially no free water, i.e., water that is not chemically bound or physically adsorbed on the surface of the particulate solid, are generally preferred for use in the invention, amounts of free water up to about 3 weight percent may have no deleterious effect and may, in fact, actually enhance the effectiveness of certain compositions for certain uses. Since the function of the free water is not clearly understood, the desirability of its presence and optimum amount is best determined experimentally.

In compounding the invention, the surface active agent is first blended with any other organic components to be incorporated in the fluid, and the organic components are thoroughly mixed. The alumina or silica-alumina is then added as rapidly as possible to the blend of organic ingredients, preferably over a blending period of less than one hour. The mixture may then be milled in a three-roll mill until it is fluid and uniform.

EXAMPLE I

Eta alumina having 7.41% volatiles (determined by heat treatment for three hours at 1000° C.), a surface area of 282 square meters per gram and an ASTM pore volume (carbon tetrachloride method) of 0.25 cubic centimeter per gram was incrementally added to a blend of 5.143 grams of mineral seal oil (See Table I) and 0.701 gram of glycerol monooleate. When 7.511 grams of the alumina had been added, the mix (stirred with a small spatula) became a semi-dry powder which became a soft grease after passing six times through a laboratory 3-roll paint mill. This grease had a ¼ scale penetration of 64, and exhibited AC forces of about 55–60 ounces per square inch using the AC test apparatus heretofore described. DC forces of approximately 25 ounces per square inch and a conductivity of only 0.1 milliampere were obtained when the fluid was tested at 180 kilovolts per inch between parallel plates 0.0025 inch apart with a plate surface area of 0.44 square inch.

EXAMPLE II

Exactly 2.0 grams of the composition of Example I was put into a 5 ml. beaker. Exactly 0.020 gram of 1-hydroxyethyl 2-heptadecyl imidazolene (90%) was added, stirred into the composition with a spatula and milled 4 times on the 3 roll mill to assure uniformity. Under the same test conditions DC forces increased 4 ounces per square inch and AC forces decreased 4 ounces per square inch. Another 0.020 gram of the imidazolene were added and the composition mixed and milled. The new fluid sample displayed DC forces approximately 11 ounces per square inch higher than before. Further addition of the imidazolene resulted in lowering of both AC and DC forces. Unquestionably, higher forces could have been obtained by either increasing the solids content or by decreasing the total amount of fluidizer.

The term "fluid" as used in this specification and the appended claims will be understood to describe both materials which flow freely as a liquid and materials which flow only upon application of a moderate force, as do greases and soft gels.

We claim:

1. An electroviscous fluid consisting essentially of a non-polar oleaginous vehicle having a dielectric constant not greater than about ten and from about 20 to about 60 weight percent of a particulate solid from the group consisting of alumina, silica-alumina and mixtures thereof, said particulate solid having an average particle size in the range of about 0.04 to 10 microns diameter.

2. The fluid of claim 1 in which the oleaginous vehicle is a mineral oil.

3. The fluid of claim 1 in which the particulate solid is alumina.

4. The fluid of claim 3 in which the alumina is eta alumina.

5. The fluid of claim 3 in which the alumina is chi alumina.

6. The fluid of claim 1 in which the particulate solid is silica-alumina.

7. The fluid of claim 1 additionally containing from about 5 to about 25 weight percent of a surface active agent from the group consisting of anionic, cationic and nonionic surface active agents.

8. The fluid of claim 7 in which the surface active agent is glycerol monooleate.

9. The fluid of claim 8 in which the oleaginous vehicle is a mineral oil and which additionally contains acetic acid in an amount of from about 1 to 3 percent by weight.

10. The fluid of claim 1 additionally containing an amine in an amount of about 0.1 to about 25 percent by weight.

11. The fluid of claim 10 in which the amine is 1-hydroxyethyl 2-heptadecyl imidazolene.

12. The fluid of claim 1 additionally containing from about 0.5 to about 10 weight percent of a fatty acid having from about 1 to 6 carbon atoms.

13. The fluid of claim 12 in which the fatty acid is acetic acid.

14. The fluid of claim 1 additionally containing free water in an amount less than about 3 weight percent.

15. A normally fluid composition capable of exhibiting a substantial increase in apparent viscosity under the influence of a transient electric field consisting essentially of about 35 to 60 weight percent of particulate solids selected from the group consisting of eta alumina and chi alumina having an average particle size in the range of 0.04 to 10 microns, said alumina including water in the amount of about 4 to 17 weight percent of the dry alumina, the remainder of said composition being a nonpolar oleaginous vehicle of dielectric constant less than 5 which is weakly absorbed by alumina.

16. A composition in accordance with claim 15 in which the water content is in the range of about 6 to 12 weight percent of the dry alumina.

17. A composition in accordance with claim 16 in which said alumina is eta alumina.

18. A composition in accordance with claim 17 including glycerol monooleate in an amount sufficient to render the composition fluid but not substantially in excess of such amount, and in which the alumina has a particle size of about 0.06 to 2.0 microns.

19. A composition in accordance with claim 18 in which said vehicle is mineral seal oil.

20. A composition in accordance with claim 18 in which the eta alumina is present in an amount of about 56.2 weight percent, the oleaginous vehicle is mineral seal oil and is present in an amount of about 38.5 weight percent, the glycerol monooleate is present in an amount of about 5.3 weight percent and water is present in the alumina in an amount of about 7.41 percent based on the total weight of the alumina.

No references cited.

LEON D. ROSDOL, *Primary Examiner.*

S. S. SCHWARTZ, *Assistant Examiner.*